(12) United States Patent
Kato

(10) Patent No.: US 8,350,883 B2
(45) Date of Patent: Jan. 8, 2013

(54) SCANNING OPTICAL APPARATUS AND IMAGE FORMING APPARATUS USING SAME

(75) Inventor: Manabu Kato, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 12/845,442

(22) Filed: Jul. 28, 2010

(65) Prior Publication Data

US 2011/0025814 A1    Feb. 3, 2011

(30) Foreign Application Priority Data

Jul. 31, 2009    (JP) ................................ 2009-179027

(51) Int. Cl.
*B41J 15/14* (2006.01)
*B41J 27/00* (2006.01)

(52) U.S. Cl. ........ 347/243; 347/241; 347/244; 347/256; 347/259; 347/261

(58) Field of Classification Search .................... None
See application file for complete search history.

(56) References Cited

U.S. PATENT DOCUMENTS

| | | | |
|---|---|---|---|
| 2003/0071203 A1* | 4/2003 | Inagaki | 250/234 |
| 2004/0196356 A1* | 10/2004 | Yoshida | 347/241 |
| 2009/0091732 A1* | 4/2009 | Kato | 355/67 |

FOREIGN PATENT DOCUMENTS

| | | |
|---|---|---|
| JP | 2002-287062 A | 10/2002 |
| JP | 2003-222812 A | 8/2003 |

* cited by examiner

*Primary Examiner* — Matthew Luu
*Assistant Examiner* — Kendrick Liu
(74) *Attorney, Agent, or Firm* — Carter, DeLuca, Farrell & Schmidt LLP

(57) ABSTRACT

An scanning optical apparatus of present invention converts plural light beams emitted from corresponding light source units by a light beam conversion unit, deflectively scans by a deflection unit, focuses by an imaging optical unit onto corresponding scanned surfaces. At least two of light source units are arranged along a direction perpendicular to the direction in which the light beams are emitted. The light beam conversion unit includes plural light beam conversion elements that reflect the light beams emitted in the same direction from the light source units to deflect the light beams in the same direction. Each of the light beam conversion elements has at least one reflecting surface having a power and at least one diffracting surface having a power, and has different powers with respect to the main scanning direction and with respect to the sub scanning direction.

12 Claims, 9 Drawing Sheets

SCANNING OPTICAL APPARATUS AND IMAGE FORMING APPARATUS USING SAME

BACKGROUND OF THE INVENTION

1. Field of the Invention

The present invention relates to a scanning optical apparatus and an image forming apparatus using the same. The present invention can suitably be applied to image forming apparatuses such as laser beam printers (LBP) using an electronic photography process, digital copying machines, and multi-function printers.

2. Description of the Related Art

Conventionally, in scanning optical apparatuses such as laser beam printers (LBP) and digital copying machines, a light beam that has been optically modulated in accordance with an image signal and emitted from a light source unit is converted into a collimated light beam by a collimator lens. Then, the light beam that has been made collimated is focused by a cylindrical lens into a linear image formed on a deflecting surface of a light deflector constituted by a rotary multi-face mirror (or polygon mirror) for the purpose of image tilt compensation. Then, the light beam deflectively scanned by the deflecting surface of the light deflector is focused by an imaging optical system having an fθ characteristic into a spot on the surface of a photosensitive recording medium (or photosensitive drum) to optically scan that surface, thereby recording an image.

Heretofore, various tandem type scanning optical apparatuses have been developed (see Japanese Patent Application Laid-Open No. 2003-222812). In the tandem type scanning optical apparatuses, a plurality of divergent light beams emitted from a plurality of light source units are narrowed by a plurality of corresponding aperture stops, converted into collimated light beams by a plurality of collimator lenses, and incident on a plurality of cylindrical lenses. The plurality of light beams emergent from the plurality of cylindrical lenses are incident on different deflecting surfaces of an optical deflector (or polygon mirror) serving as a deflection unit to form linear images, and deflectively scanned in different directions respectively. The light beams thus deflectively scanned are guided respectively onto different surfaces to be scanned (or photosensitive drum surfaces) by different imaging optical units. Image recording is performed in this way.

Heretofore, there has been developed various scanning optical apparatuses in which changes in the imaging performance caused by environmental changes, specifically temperature changes (temperature compensation characteristics) and changes in the imaging performance caused by changes in the wavelength of laser light (wavelength characteristics) are made small (see Japanese Patent Application Laid-Open No. 2002-287062).

In the conventional tandem type scanning optical apparatuses described above, in order to facilitate ease of assembly, the plurality of cylindrical lenses are made up of a plurality of optical elements arranged along the main scanning direction, which are integrally manufactured by plastic molding. Japanese Patent Application Laid-Open No. 2002-228812 discloses a case in which cylindrical lenses, which are commonly provided for the respective light sources separately, are made integral, whereby, according to the description in this patent document, reduction in the entire size of the apparatus can be achieved.

In recent years, in order to achieve further size reduction and to facilitate ease of assembly, it has been required in the tandem type scanning optical apparatus to make integral the collimator lenses that convert the conditions of light beams emitted from light source units into other conditions. However, it has been considered difficult to make the collimator lenses integral for the following reasons.

(1-1) It is necessary to adjust the position of the collimator lenses relative to the corresponding light emitting portions (or light emitting points) of a plurality of light source units with respect to the direction of the optical axis and the directions perpendicular to the optical axis. (This adjustment will be hereinafter referred to as the "laser adjustment".)

(1-2) In cases where the light source unit is adjusted in the laser adjustment, it is necessary to once press-fit the light source unit into an intermediate member and thereafter adjust it, because the shape of the laser package is complex.

(1-3) Closeness of the plurality of light source units to each other will lead to physical interference of adjusting mechanisms and jigs that hold them.

On the other hand, to combine parts, it is desirable from the viewpoint of productivity to manufacture them by plastic molding. In cases where plastic molding is employed, there arises a problem that a change in the environmental condition (e.g. temperature) will cause a change in the refractive index in the plastic, leading to a displacement of the focus position after beam conversion, in addition to the above described problems (1-1) to (1-3). Especially in the case of a multi-beam light source having a plurality of light emitting portions, one problem is that there is a difference in the wavelength between the light emitting portions by manufacturing tolerance, which makes it difficult to employ conventional temperature compensation using a refracting surface and diffracting surface and utilizing a change in the wavelength caused by a temperature rise.

On the other hand, if collimator lenses made of a plastic are realized, anamorphic surfaces can easily be formed, and therefore it is possible to integrate the functions of collimator lens and cylindrical lens (which are separate parts in the conventional apparatuses) into one part. Japanese Patent Application Laid-Open No. 2002-287062 discloses, in FIG. 2 thereof, temperature compensation for an optical element having two transmitting surfaces and at least one reflecting surface in a laser scanning apparatus. However, this patent document does not suggest any solution to the problem of wavelength characteristics in the case where multi-beam light source is employed nor disclose an optical configuration that is designed in such a way as to facilitate ease of assembly when applied to a tandem type scanning optical apparatus.

SUMMARY OF THE INVENTION

An object of the present invention is to provide a scanning optical apparatus that can achieve compatibility of preferable wavelength characteristics (changes in the imaging characteristics with changes in the wavelength of laser light) and preferable temperature compensation characteristics (changes in imaging characteristics due to temperature changes) and can achieve ease of assembly and improvement in productivity, and to provide an image forming apparatus using such a scanning optical apparatus.

To achieve the above object, according to one mode of the present invention, there is provided an optical scanning apparatus comprising a plurality of light source units, a light beam conversion unit that converts the beam condensing condition of a plurality of light beams emitted from a plurality of light emitting portions of the plurality of light source units, a deflection unit that deflectively scans the plurality of light beams emitted from the light beam conversion unit, and a plurality of imaging optical systems that focuse the plurality of light beams defelectively scanned by a different deflecting surface of the deflection unit onto surfaces to be scanned corresponding to the respective light beams, wherein the plurality of light source units are arranged along a direction perpendicular to the direction in which the light beams are emitted from the plurality of the light emitting portions, the light bean conversion unit includes a plurality of light beam conversion elements that reflect the plurality of light beams emitted in the same direction from the respective light emitting portions of the plurality of light source units to deflect the light beams in the same direction, and each of the plurality of light beam conversion elements has different powers with respect to a main scanning direction and with respect to a sub scanning direction.

In the above-described optical scanning apparatus, it is preferred that the plurality of light beam conversion elements be arranged in such a way that the distance along the main scanning direction between adjacent two light source units among the plurality of light source units is larger than the distance between the light beams corresponding to the adjacent two light source units on the emergence surface of the light beam conversion unit.

It is also preferred that the plurality of light beams emitted from the plurality of light emitting portions of the plurality of light source units be converted by the light beam conversion unit into collimated light beams with respect to the main scanning direction and convergent light beams that are focused on the deflecting surface of the deflection unit with respect to the sub scanning direction.

It is also preferred that the plurality of light source units be multi-beam light sources each having a plurality of light emitting portions. Alternatively, it is preferred that the plurality of light source units be mounted on the same electrical substrate.

It is also preferred that each of the reflecting surfaces of the plurality of light beam conversion elements have different powers with respect to the main scanning direction and with respect to the sub scanning direction.

It is also preferred that at least two light beam conversion elements among the plurality of light beam conversion elements have the same focal length with respect to the main scanning direction.

It is also preferred that the reflecting surfaces of the plurality of light beam conversion elements be total reflection surfaces.

It is also preferred that each of the plurality of light conversion elements be made of a plastic and have at least one reflecting surface having a power and at least one diffracting surface having a power.

It is also preferred that an image forming apparatus according to another mode of the present invention comprise a plurality of image bearing members that have surfaces as the surfaces to be scanned of the above-described scanning optical apparatus and on which images of different colors are formed.

A scanning optical apparatus according to another mode of the present invention comprises a plurality of light source units, a light beam conversion unit that converts the beam condensing condition of a plurality of light beams emitted from a plurality of light emitting portions of the plurality of light source units, a deflection unit that deflectively scans the plurality of light beams emitted from the light beam conversion unit, and a plurality of imaging optical system that focuses the plurality of light beams defelectively scanned by a different deflecting surface of the deflection unit onto a surface to be scanned, wherein the light beam conversion unit includes a plurality of light conversion elements made of a plastic that converts the beam condensing condition of each of the plurality of light beams emitted from the plurality of light source units, the light beam conversion element has a transmitting surface not having a refracting power and a reflecting surface having a power, and a diffraction element having a diffracting power is provided on at least one of the transmitting surface and the reflecting surface.

In this scanning optical apparatus, it is preferred that the diffracting power of the diffraction element be designed in such a way as to compensate a focus variation resulting from a wavelength difference between the plurality of light beams emitted from the plurality of light source units and a focus variation caused due to a temperature change.

It is preferred that an image forming apparatus according to another mode of the present invention comprise a plurality of image bearing members that have surfaces as the surface to be scanned of the above-described scanning optical apparatus and on which images of different colors are formed.

According to the present invention, there can be provided a scanning optical apparatus that can achieve compatibility of wavelength characteristics (changes in the imaging characteristics with changes in the wavelength of laser light) and temperature compensation characteristics (changes in imaging characteristics due to temperature changes) and can achieve ease of assembly and improvement in productivity, and an image forming apparatus using such a scanning optical apparatus.

Further features of the present invention will become apparent from the following description of exemplary embodiments with reference to the attached drawings.

DESCRIPTION OF THE EMBODIMENTS

In the following, embodiments of the present invention will be described with reference to the drawings.

Figure 1:
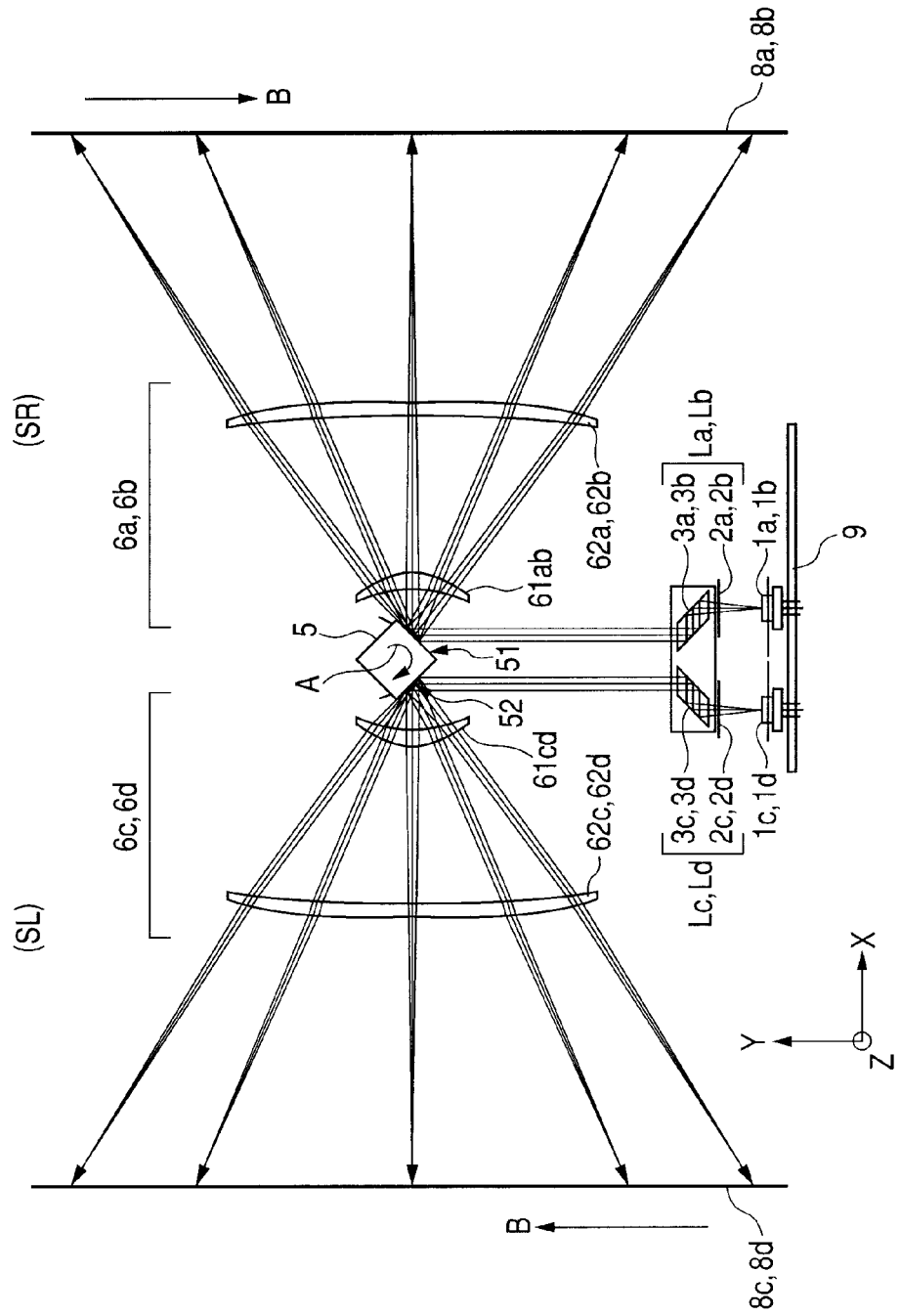
FIG. 1 is a cross sectional view of a scanning optical apparatus according to a first embodiment of the present invention taken on a main scanning section.
Figure 2:
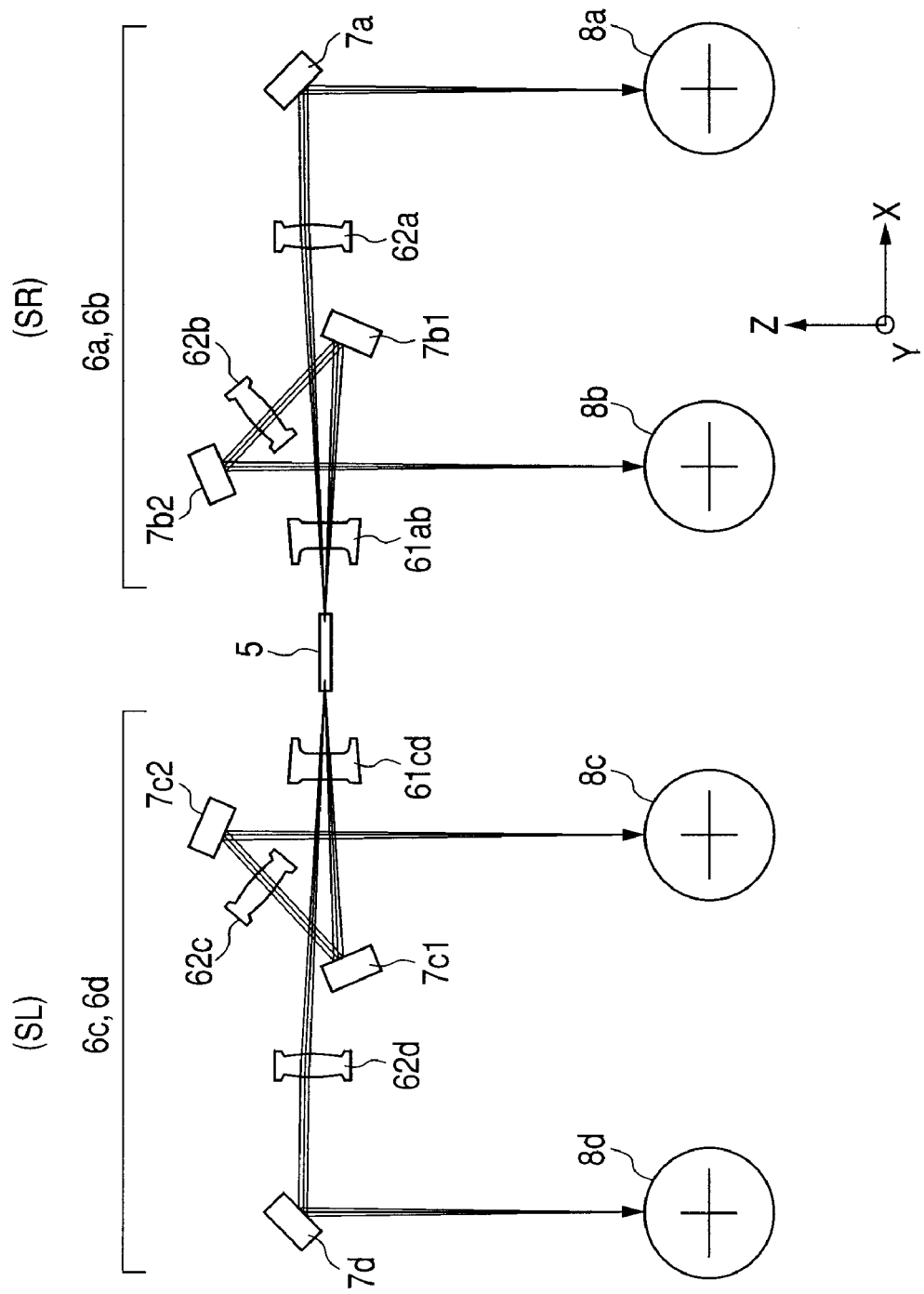
FIG. 2 is a cross sectional view of the scanning optical apparatus according to the first embodiment of the present invention taken on a sub scanning section.

FIG. 1 is a cross sectional view taken along the main scanning direction (main scanning section), showing the relevant portions of a first embodiment of the present invention. FIG. 2 is a cross sectional view taken along the sub scanning direction (sub scanning section), showing the relevant portions of the first embodiment of the present invention.

In the following description, the term "sub scanning direction" (or the Z direction) will refer to the direction parallel to the rotational axis of a deflection unit. The term "main scanning section" will refer to a cross section whose normal is the sub scanning direction (i.e. a direction parallel to the rotational axis of the deflection unit). The term "main scanning direction" (or the Y direction) will refer to the direction in which the light beam projected onto the main scanning section is deflectively scanned by the deflection unit. The term "sub scanning section" will refer to a cross section whose normal is the main scanning direction.

The apparatus has a first station (or scanning unit) SR and a second station SL. The apparatus has light source units (or multi-beam light sources) 1a to 1d, each of which has a plurality of light emitting portions (or light emitting points). The light source unit may be, for example, a multi-beam semiconductor laser. The multi-beam semiconductor laser will sometimes be referred to simply as the "semiconductor laser" hereinafter.

In this embodiment, at least two light source units among the plurality of light source units 1a to 1d are arranged along a direction perpendicular to the direction in which the light beams are emitted from the light source units, as shown in FIG. 1. Specifically, at least two light source units are arranged side by side along at least one of the main scanning direction and the sub scanning direction. The light source units 1a to 1d are mounted on the same electrical substrate 9.

The apparatus has stops 2a to 2d, which narrow the light beams (or regulate the light quantity). The apparatus has a light beam conversion unit 3 (3a to 3d), which converts or changes the beam condensing condition of the plurality of light beams emitted from the light emitting portions of the plurality of light source units 1a to 1d. The light conversion unit 3 in this embodiment includes a plurality of plastic molded light beam conversion elements 3a to 3d that reflect the plurality of light beams emitted from the plurality of light source units 1a to 1d in the same direction to deflect them in the same direction. The stops 2a to 2d and the light beam conversion elements 3a to 3d are components of incidence optical systems (or condensing optical systems) La to Ld respectively.

The apparatus has a light deflector 5 serving as the deflection unit. The light deflector 5 comprises a rotary multi-face mirror (or polygon mirror) having a plurality of deflecting surfaces. The light deflector 5 is rotated by a drive unit such as a motor at a constant speed in the direction indicated by arrow A to deflectively scan the light beams coming from the incidence optical systems La to Lb. The apparatus is provided with imaging optical units 6a to 6d serving as the imaging optical systems. The imaging optical units 6a to 6d focus the plurality of light beams coming from the deflection unit 5 onto the respective corresponding surfaces to be scanned 8a to 8d. The imaging optical units 6a, 6b in the first station (scanning unit) SR include a first imaging lens 61ab that belongs in common to them and second imaging lenses 62a and 62b respectively. The imaging optical units 6c, 6d in the second station (scanning unit) SL include a first imaging lens 61cd that belongs in common to them and second imaging lenses 62c and 62d respectively. The imaging optical units 6a to 6d focus the light beams representative of image information reflected and deflected by the light deflector 5 onto surfaces to be scanned or photosensitive drum surfaces 8a to 8b respectively. The imaging optical units 6a to 6d are arranged in such a way as to make the deflecting surfaces 51, 52 of the light deflector 5 and the photosensitive drum surfaces 8a to 8d conjugate with each other in the sub scanning section, thereby compensating the surface tilt of the deflecting surfaces.

In the first station SR, there are mirrors (reflecting mirrors) 7a, 7b1, 7b2 that fold the optical paths in the first station SR. In the second station SL, there are mirrors 7c1, 7c2, 7d that fold the optical paths in the second station SL. The photosensitive drum surfaces (or photosensitive drums) 8a, 8b are the surfaces to be scanned in the first station SR, and the photosensitive drum surfaces (or photo sensitive drums) 8c, 8d are the surfaces to be scanned in the second station SL.

(Scanning Optical Apparatus)

The scanning optical apparatus according to this embodiment is adapted to guide light beams emitted from the light emitting portions of the four light source units 1a to 1d onto the four different surfaces to be scanned 8a to 8d respectively to thereby scan the surfaces. In the following description of the function of the scanning optical apparatus, the beam emitted from one light source unit 1a will be described for the sake of simplicity. The same description applies similarly to the light beams emitted from the other light source units 1b to 1d.

The light quantity of the divergent light beam emitted from the semiconductor laser 1a serving as the light source unit is regulated by the stop 2a, and then the light beam is incident on the corresponding light beam conversion element 3a in the light beam conversion unit 3. Although in this embodiment the light source unit emits two light beams, only one light beam is illustrated in the drawings unless otherwise specified.

The light beam conversion element 3a converts the light beam emitted from the light source unit 1a into a light beam that behaves as a nearly collimated light beam in the main scanning section (main scanning direction) and behaves as a divergent beam that is focused on the deflecting surface 51 of the deflection unit 5 in the sub scanning section (sub scanning direction). The light beam incident on the deflection unit 5 is deflectively scanned by the deflecting surface 51 toward the surface to be scanned and incident on the imaging optical unit 6a. In this embodiment, the imaging optical unit 6a is made up of a first toric lens (imaging lens) 61ab that is made of a plastic and has a power mainly with respect to the main scanning direction and a second toric lens (imaging lens) 62a that is made of a plastic and has a power mainly with respect to the sub scanning direction. The imaging optical unit 6a focuses the deflected light beam coming from the deflecting surface 51 onto the surface to be scanned 8a and compensates tilting of the deflecting surface 51.

The first toric lens 61ab in this embodiment is used in common by the two imaging optical units 6a, 6b as described before. The configuration of the imaging optical unit 6a and the method of manufacturing the imaging optical unit 6a are not limited to those described above. As the polygon mirror (or deflection unit) 5 mounted on a motor shaft (not shown) rotates, the light beam focused on the surface to be scanned 8a by the imaging optical unit 6a deflectively scans the surface 8a at a constant angular velocity along the direction indicated by arrow B (i.e. along the main scanning direction).

(Tandem Type Scanning Optical Apparatus)

The scanning optical apparatus according to this embodiment is a tandem type scanning optical apparatus that has four scanning systems to record image information corresponding to different hues on different surfaces to be scanned at the same time.

As described above, the four light source units 1a to 1d in this embodiment are arranged along a direction perpendicular to the direction in which the light beams are emitted. The light beams emitted from the light emitting portions of the light source unit 1a and the light source unit 1b are made incident on one deflecting surface 51 of the deflection unit 5, and the light beams emitted from the light emitting portions of the light source unit 1c and the light source unit 1d are made incident on the other deflecting surface 52 of the deflection unit 5. Thus, the light beams are separated to the right side and the left side of the deflection unit 5. The light beams emitted from the light source unit 1a and the light source unit 1b have different angles of incidence in the sub scanning section and are made incident on the deflecting surface 51 of the deflection unit 5 obliquely, whereby they are spatially separated by the mirror 7b1 disposed downstream of the first toric lens 61ab. The light beams emitted from the light emitting portions of the light source unit 1c and the light source unit 1d are also separated in the same way.

In this way, a plurality of light beams having different oblique incidence angles with respect to the deflection unit 5 are made incident on the two different deflecting surfaces 51, 52 of the deflection unit 5, whereby the four light beams can be scanned by one deflection unit 5 at the same time.

(Incidence Optical System)

Figure 3:
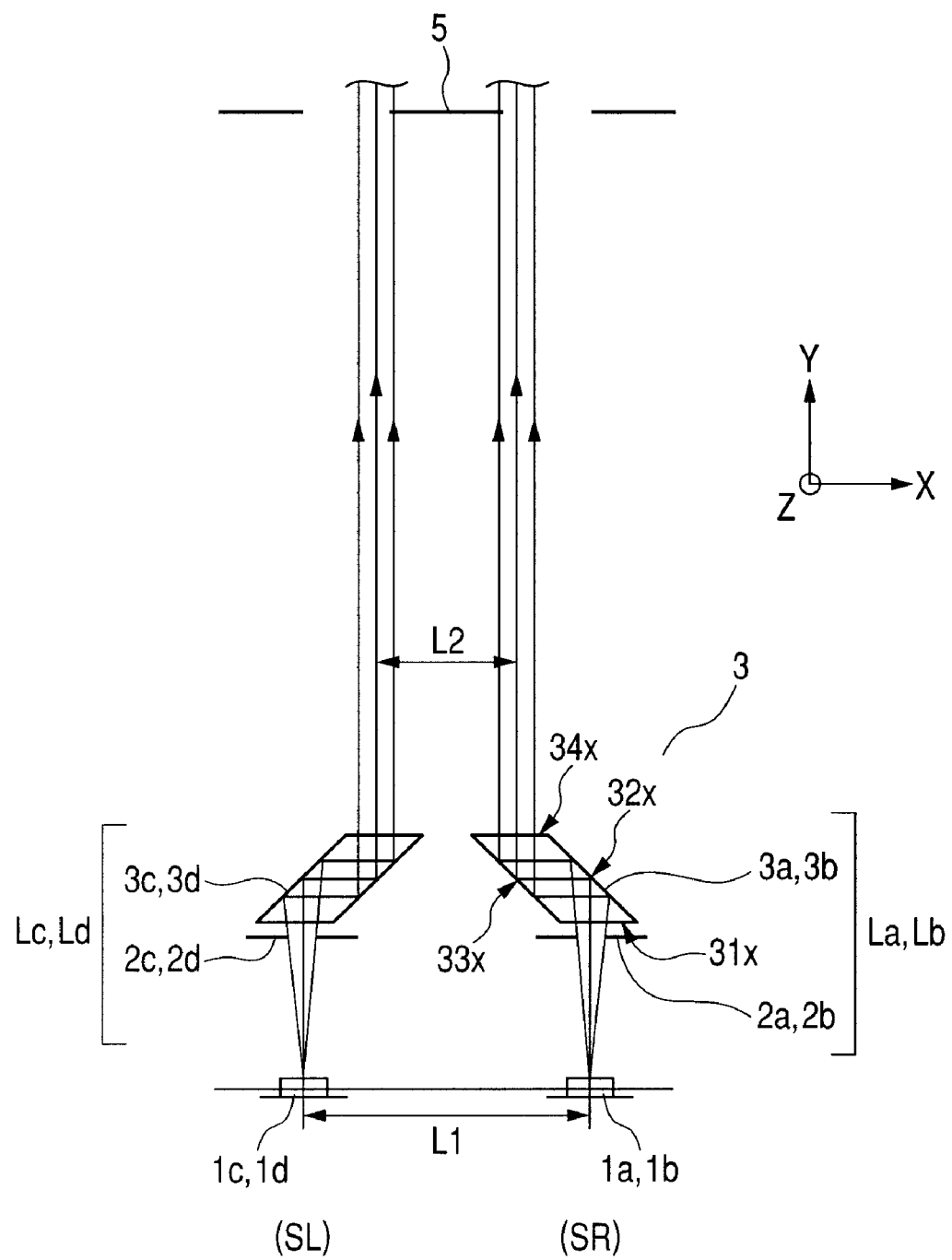
FIG. 3 is a cross sectional view of an incidence optical system of the scanning optical apparatus according to the first embodiment of the present invention taken on the main scanning section.
Figure 4:
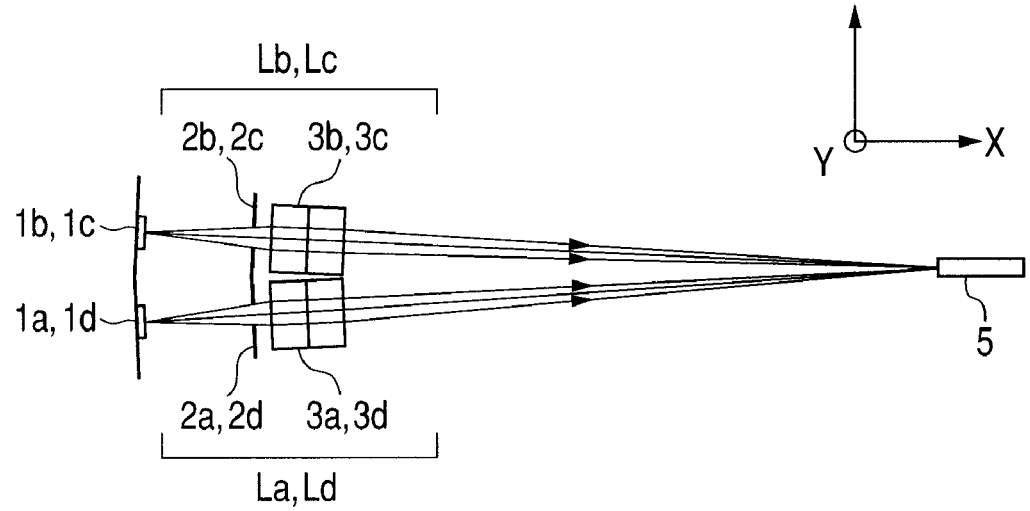
FIG. 4 is a cross sectional view of the incidence optical system of the scanning optical apparatus according to the first embodiment of the present invention taken on the sub scanning section.

The incidence optical system in this embodiment will be described with reference to FIGS. 3 and 4. FIG. 3 shows the main scanning section of the incidence optical system in the first embodiment of the present invention, and FIG. 4 shows the sub scanning section of the incidence optical system in the first embodiment of the present invention. The suffix "X" in FIG. 3 stands for "a, b".

The light beam conversion elements 3a to 3d in this embodiment each have the function of a collimator lens for collimating light beams coming from the light source units 1a to 1d into parallel light beams and the function of a cylindrical lens for condensing the light beams onto the deflecting surfaces of the light deflector with respect only to the sub scanning direction for surface tilt compensation.

In the light beam conversion unit 3, the light beam conversion elements 3a to 3d are integrated by plastic molding. Namely, one optical element provides the functions of four collimator lenses and four cylindrical lenses. This feature of the embodiment contributes not only to the simplification of the optical system configuration but also to improvement in ease of assembly and size reduction satisfactorily. In the following, the light beam conversion unit 3 will sometimes be referred to as the "anamorphic collimator lens". Table 1 shows design values for the optical surfaces from the light source unit LD to the reflecting surface Por of the deflection unit. In the tables that will be presented in the following, the expression "E–x" stands for "$10^{-x}$".

TABLE 1

|  |  | Rm | Rs | $D_2m$ | $D_2s$ | D | N |
|---|---|---|---|---|---|---|---|
| LD | light source |  |  |  |  | 11.5 |  |
| R1 | diffracting surface |  |  | −1.3727E−02 | −1.7086E−02 | 3.0 | 1.5242 |
| R2 | reflecting surface | −81.047 | −32.703 |  |  | 5.0 | 1.5242 |
| R3 | reflecting surface |  |  |  |  | 3.0 | 1.5242 |
| R4 | refracting surface |  |  |  |  | 50.0 |  |
| Por | reflecting surface |  |  |  |  |  |  |

First Embodiment

Here, the shape and the optical functions of the light beam conversion element 3a will be described by way of example. The other light beam conversion elements 3b, 3c and 3d used in this embodiment have the same configuration. The light beam conversion element 3a in this embodiment has at least one reflecting surface having a power (two surfaces R2, R3 in this embodiment) and at least one diffracting surface having a power (one surface R1 in this embodiment). The light beam conversion element 3a has different powers with respect to the main scanning direction and with respect to the sub scanning direction. Namely, the light beam conversion element 3a has transmitting surfaces R1 and R4 and reflecting surfaces R2 and R3, wherein the transmitting surfaces R1 and R4 do not have a refracting power, and the reflecting surface R2 has a refracting power.

Specifically, the incidence surface (R1) 31a of the light beam conversion element 3a has an anamorphic diffracting surface formed on a planar base shape. This surface compensates changes in the refractive index caused by temperature rises or changes in optical characteristics caused by changes in shape, utilizing its large chromatic aberration characteristics. The first reflecting surface (R2) 32a of the light beam conversion element 3a is an anamorphic surface that has different powers with respect to the main scanning direction and with respect to the sub scanning direction. The first reflecting surface (R2) 32a is a total reflection surface that satisfies the total reflection condition.

The second reflecting surface (R3) 33a of the light beam conversion element 3a has a planar shape and has the function of deflecting (or reflecting) the light beam toward the deflecting surface of the deflection unit 5. The emergence surface (R4) of the light beam conversion element 3a is a planar surface having no power or a low power (refracting surface). The diffracting surface in this embodiment has a shape in which a diffraction grating represented by the following phase function is provided on a base refracting surface.

$$\phi = m\lambda = d_{2m}Y^2 + d_{2s}Z^2$$

(m is the order of diffraction, which is, in this embodiment, positive first order diffraction)

The plurality of light beams emitted from the plurality of light source units 1a to 1d are incident on the respective corresponding light beam conversion elements 3a to 3d of the light beam conversion unit 3 after passing through the apertures 2a to 2d. Thus, the light beams are converted and guided onto the corresponding deflecting surfaces 51, 52.

(Compatibility of Wavelength Characteristics and Temperature Compensation Characteristics)

Here, the reason why the reflecting surface having a power (i.e. the first reflecting surface 32a) is used in the light beam conversion element 3a of the anamorphic collimator lens 3 will be discussed. The discussion about the light beam conversion element 3a also applies similarly to the other light beam conversion elements 3b to 3d.

The first reason for using the reflecting surface having a power is to achieve compatibility of the wavelength characteristics (i.e. optical characteristics changes associated with changes in the wavelength without temperature changes) and temperature characteristics (i.e. optical characteristics changes associated with changes in the wavelength caused by temperature changes) of the anamorphic collimator lens by making the degree of changes in optical characteristics caused by changes in temperature small. In this embodiment in particular, since multi-beam light sources that emit a plurality of light beams are used, changes in optical characteristics caused by a wavelength difference between the plurality of light sources cannot be adjusted on the "light-source-by-light-source" basis. Therefore, the aforementioned wavelength characteristics have higher importance.

Normally, a change in the refractive index in a medium caused by a change in temperature leads to a change in optical characteristics. In the case of the reflecting surface, since the refractive index of the medium before reflection and the refractive index of the medium after reflection are the same, no change in optical characteristics due to a change in the refractive index will occur. For this reason, the power of the light beam conversion element 3a is mainly allotted to the reflecting surface, that is, the first reflecting surface 32a, in this embodiment. In consequence, the power of the refracting surface (i.e. the emergence surface 34a) of the light beam conversion element 3a may be made low or equal to zero, whereby the degree of changes in optical characteristics caused by changes in the refractive index due to temperature changes occurring on the refracting surface can be made small.

In this embodiment, temperature compensation is performed for changes in optical characteristics caused by expansion/contraction of optical surfaces that might occur on all the optical surfaces due to temperature changes as well as for changes in optical characteristics caused by changes in the refractive index. The amount of such compensation can also be made small. The principle of the temperature compensation is to correct the aforementioned changes in optical characteristics by strong axial chromatic aberration provided by the diffracting surface based on the fact that a change in the wavelength of the semiconductor laser and a change in the refractive index occur at the same time due to a change in the temperature. This is a known technology. What is particular to the embodiment is that the power of the diffracting surface can be made relatively low because the compensation amount per se is made small.

Figure 5:
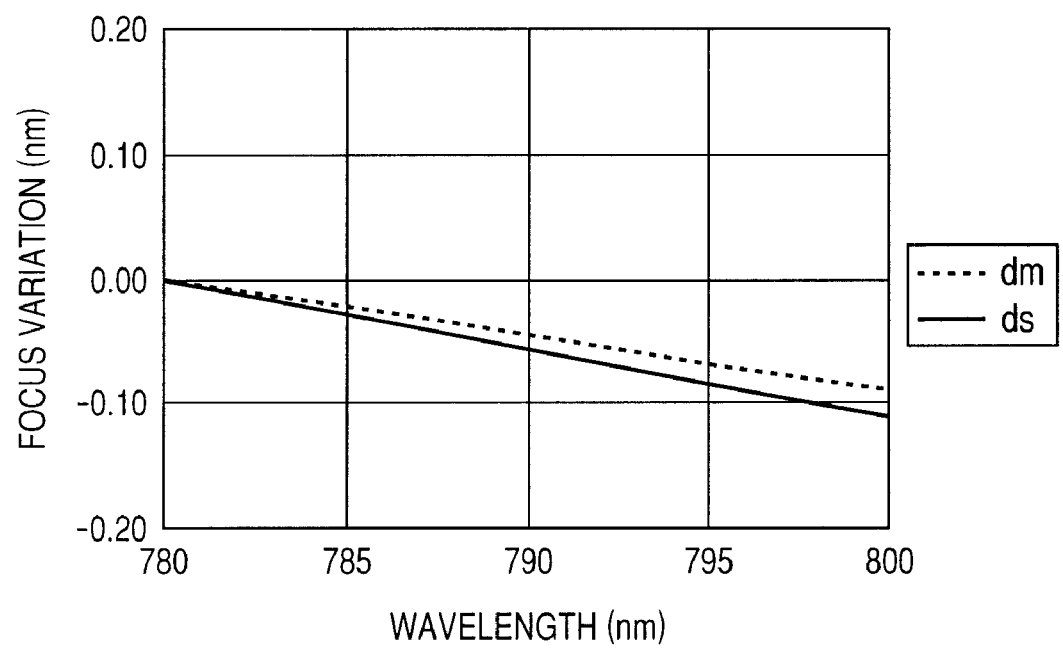
FIG. 5 shows wavelength characteristics of an anamorphic collimator lens used in the scanning optical apparatus according to the first embodiment of the present invention.

FIG. 5 shows wavelength characteristics of the light beam conversion element 3a of the anamorphic collimator lens 3 according to the embodiment. FIG. 5 shows focus variations with respect to the main scanning direction (dm) and the sub scanning direction (ds) with changes in the wavelength. The wavelength characteristics of the other light beam conversion elements 3b to 3d are the same as the light beam conversion element 3a.

Typically, there is a wavelength difference of about 2 nm between the light beams emitted from a plurality of light emitting portions (light emitting points) of a semiconductor laser by its tolerance. As shown in FIG. 5, in this embodiment, a variation in the optical characteristic (i.e. a variation in the focus position) associated with a wavelength difference of 2 nm is 9 µm in the main scanning direction and 11 µm in the sub scanning direction. These values of the variations are satisfactorily small. The absolute wavelength of the semiconductor laser varies by an amount larger the aforementioned wavelength difference. However, this does not matter, because this can be corrected by "laser adjustment" (i.e. adjustment of the distance between the light source unit and the anamorphic collimator lens) as long as the wavelengths of the light beams emitted from the plurality of light emitting portions are uniform.

Figure 6:
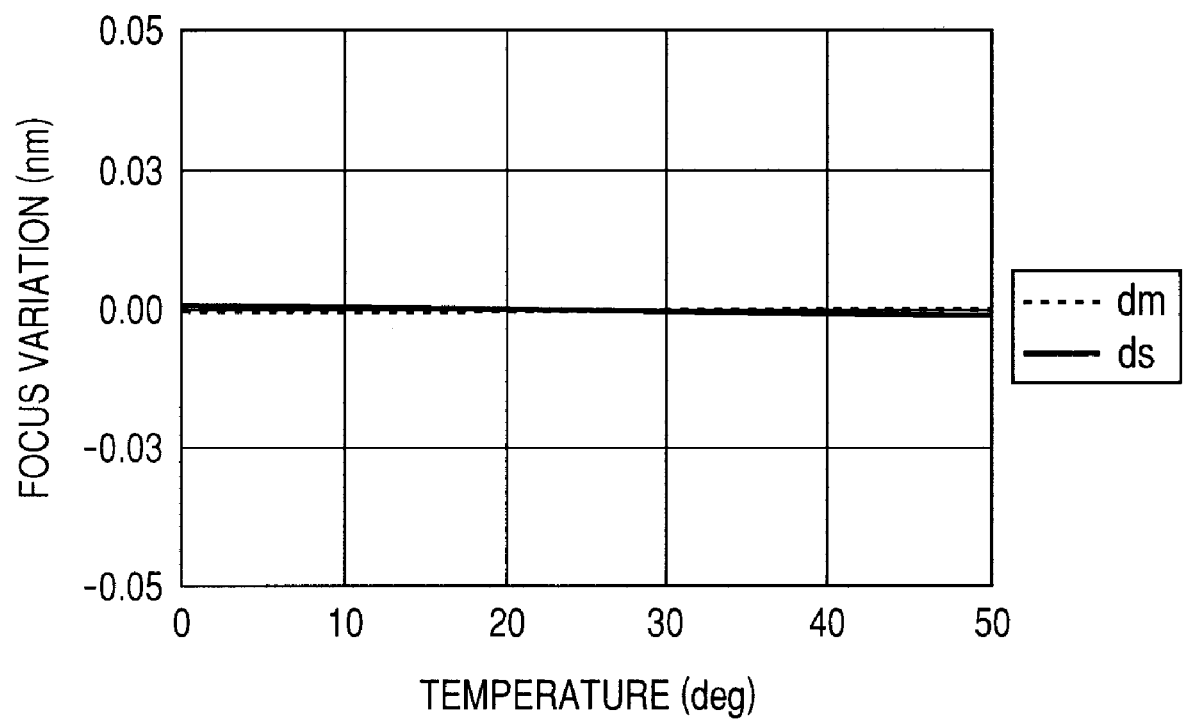
FIG. 6 shows temperature characteristics of the anamorphic collimator lens used in the scanning optical apparatus according to the first embodiment of the present invention.

FIG. 6 shows temperature characteristics of the light beam conversion element 3a of the anamorphic collimator lens 3 according to the embodiment. FIG. 6 shows focus variations with respect to the main scanning direction (dm) and the sub scanning direction (ds) with changes in the wavelength and changes in the refractive index that occur at the same time due to changes in the temperature. The temperature characteristics of the other light beam conversion elements 3b to 3d are the same as the light beam conversion element 3a.

Temperature changes that are expected to occur in the body of the image forming apparatus are about ±25 degrees typically. As shown in FIG. 6, changes in the optical characteristic associated with such temperature changes are not larger than 1 µm in both the main scanning direction and the sub scanning direction, which are satisfactorily small. The focus variations discussed herein with reference to FIGS. 5 and 6 are those on the light source unit side. Focus variations on the scanned surface side corresponding to those on the light source unit side can be obtained by multiplying them by the axial magnification of the entire optical system, which is typically about 25 to 100.

(Providing Adequate Space between Light Source Units)

The second reason for using the reflecting surface having a power is to increase the distance between the light sources, which is an important issue when integrating the incidence optical systems corresponding to the respective hues in a tandem type scanning optical apparatus, to provide an adequate space that allows laser adjustment. The laser adjustment is performed typically in the following steps.

(2-1) A focus adjustment step of adjusting the distance between the semiconductor laser and the collimator lens in such a way that the emergent light beam becomes a specific collimated light beam, a specific convergent light beam, or a specific divergent light beam.

(2-2) An illumination position adjustment step of adjusting the coaxiality (i.e. the adjustments in directions perpendicular to the optical axis) of the semiconductor laser and the collimator lens so that the emergent light beam illuminates a specific target.

(2-3) A pitch adjustment step of adjusting the pitch of the plurality of light beams on the surface to be scanned by rotating the semiconductor laser about the emission axis so that the pitch has a specific value, in the case of a multi-beam scanning optical apparatus.

It is optically equivalent to perform these adjustments by shifting the semiconductor laser or to perform these adjustments by shifting the collimator lens. Since the semiconductor laser needs to be mounted on the electrical substrate by soldering or other means, it is typical to shift the collimator lens, which is easier to adjust.

In this embodiment, however, since the collimator lens has an integral structure in which the four optical elements are integrated, the positions thereof cannot be adjusted individually. For this reason, in this embodiment the positions of the semiconductor lasers 1a to 1d corresponding to the light beam conversion elements 3a to 3d are adjusted to thereby adjust the focus, illumination positions and pitch of the semiconductor lasers 1a to 1d. What is important with the adjustment process is to provide a space for allowing chucking of each semiconductor laser with an adjustment tool for adjustment and a space for allowing fixation of the semiconductor laser after the adjustment. The space for allowing fixation of the semiconductor laser refers to a space in which an optical fiber of a UV irradiation apparatus that is used to fixedly adhere the semiconductor laser to its holder using a UV curable resin is received.

In this embodiment, as shown in FIG. 3, the light beams emitted from the light source units 1a to 1d are deflected by the reflecting surfaces of the corresponding light beam conversion elements 3a to 3d in directions toward each other, and then all the light beams are further deflect in such a way that the light beams are incident on the deflecting surfaces of the deflection unit 5. With this configuration, the distance between the light source units with respect to the main scanning direction (i.e. the distance (L1) between the light source units 1a, 1b and the light source units 1c, 1d) is made larger than the distance (L2) between the light beams corresponding to at least two light source units on the emergence surface of the anamorphic collimator lens 3. Specifically, the former distance (L1) is 20 mm, and the latter distance (L2) is 10 mm.

In consequence, in this embodiment, the distance between the light source units can be increased by 10 mm as compared to the distance of 10 mm in the case where collimator lenses without reflecting surfaces is used. Thus, the increased space can be made use of as a space for allowing chucking of the semiconductor lasers for adjustment and as a space for allowing fixation of the semiconductor lasers after the adjustment.

With the above-described configuration of the incidence optical system, the four light source units 1a to 1d can be arranged along a direction perpendicular to the direction in which the light beams are emitted. Therefore the four light source units 1a to 1d can be mounted on the same electrical substrate 9.

By arranging the plurality of light source units 1a to 1d along a direction perpendicular to the direction in which the light beams are emitted, an efficient circuit design can be achieved by integration in the light emission circuit for the plurality of light source units 1a to 1d, whereby simplification of the light source mounting substrate of the light source (or electrical substrate) can be achieved.

In this embodiment, each laser casing is directly mounted on a laser casing mount portion of an optical box. However, a sub unit (which may sometimes be called a laser unit) that holds a plurality of laser casing together may be prepared, and the laser adjustment may be performed on the sub unit, and then it may be set in the optical box. In this case also, the same advantageous effects can be achieved.

As described above, in this embodiment, the light beam conversion unit 3 is made up of a plurality of light beam conversion units 3a to 3d that reflect the light beams emitted from the light emitting portions of the plurality of light source units 1a to 1d in the same direction to deflect them in the same direction. Each of the plurality of light beam conversion elements 3a to 3c is configured to have at least one reflecting surface having a power and at least one diffracting surface having a power and have different powers with respect to the main scanning direction and with respect to the sub scanning direction. Thus, in this embodiment, compatibility of wavelength characteristics and temperature compensation characteristics is achieved even with the light conversion elements made of a material having high productivity such as a plastic. By manufacturing the light beam conversion elements using a resin, they can be designed to provide the function of a cylindrical lens integrally. Furthermore, by arranging the reflecting surfaces of the plurality of light beam conversion elements 3a to 3d appropriately, the distance between the light source units of the scanning optical apparatus can be made large enough to allow laser adjustment, and in addition the optical elements provided for a plurality of light beams in the scanning optical apparatus can be combined.

As described above, according to the embodiment, the functions of the incidence optical system can be integrated and the optical elements can be combined without a loss of optical performance while maintaining ease of assembly and productivity. Thus, a tandem type optical scanning apparatus that has enhanced performance and is easily assembled is realized. Although the light source unit in this embodiment is a multi-beam light source that has a plurality of light emitting portions, the light source unit is not limited to this. A light source having a single light emitting portion may also be employed.

(Second Embodiment)

Figure 7:
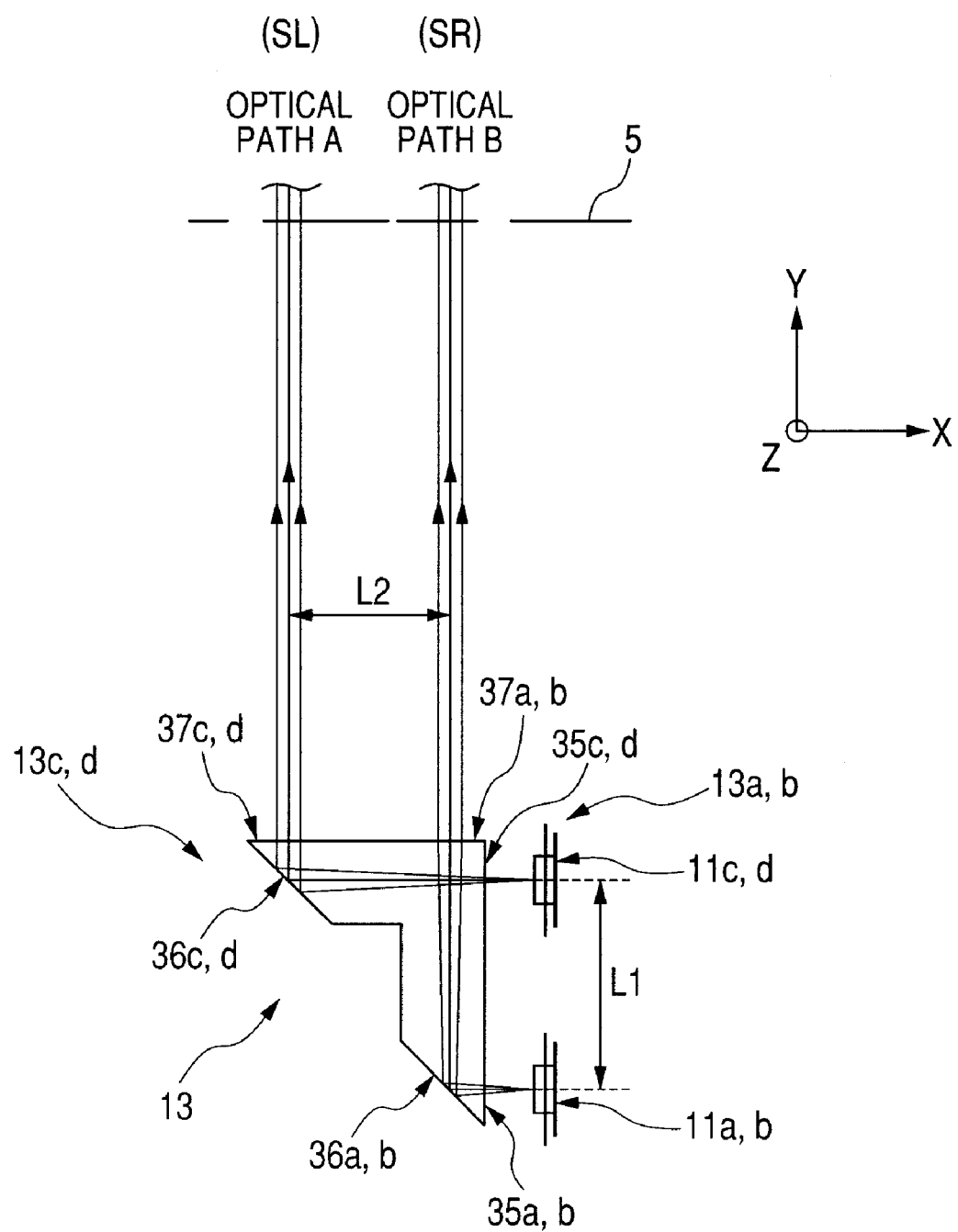
FIG. 7 is a cross sectional view of an incidence optical system of a scanning optical apparatus according to a second embodiment of the present invention taken on the main scanning section.

FIG. 7 is a cross sectional view taken along the main scanning direction, showing the relevant portions of a scanning optical apparatus according to a second embodiment. In FIG. 7, the elements same as those in FIG. 3 are designated by the same reference signs.

This embodiment differs from the above-described first embodiment in the arrangement of the light source units 11a to 11d and the structure of the anamorphic collimator lens 13 serving as a light beam conversion unit. The other structures and optical functions are the same as those in the first embodiment, and advantageous effects similar to those of the first embodiment will be achieved with the second embodiment.

In FIG. 7, each of the light source units 11a to 11d has a plurality of light emitting portions and includes, for example, a multi-beam semiconductor laser. In this embodiment, at least two light source units among the plurality of light source units 11a to 11d are arranged along a direction perpendicular to the direction in which the light beams are emitted from the light source units, as shown in FIG. 7. Specifically, at least two light source units are arranged side by side along at least one of the main scanning direction and the sub scanning direction.

The apparatus has an anamorphic collimator lens 13 serving as a light beam conversion unit. The anamorphic collimator lens 13 is a plastic molded member. The anamorphic collimator lens 13 used in this embodiment includes a plurality of light beam conversion elements 13a to 13d that reflect a plurality of light beams emitted from the plurality of light source units 11a to 11d in the same direction to deflect them in the same direction. Table 2 shows design values for the optical surfaces from the light source unit LD to the reflecting surface Por of the deflection unit in this embodiment.

TABLE 2

|  |  | Rm | Rs | $D_2m$ | $D_2s$ | D | N |
|---|---|---|---|---|---|---|---|
| Optical path A | | | | | | | |
| LD | light source | | | | | 5.0 | |
| R1 | refracting surface | 15.883 | 4.5378 | | | 16.0 | 1.5242 |
| R2 | reflecting surface | −94.744 | −72.122 | | | 3.0 | 1.5242 |
| R3 | diffracting surface | | | −7.3591E−04 | −1.7232E−03 | 50.0 | |
| Por | reflecting surface | | | | | | |
| Optical path B | | | | | | | |
| LD | light source | | | | | 5.0 | |
| R1 | refracting surface | | | | | 3.0 | 1.5242 |
| R2 | reflecting surface | −83.563 | −17.608 | | | 20.0 | 1.5242 |
| R3 | diffracting surface | −22.010 | −100.150 | −8.9243E−04 | −1.5642E−03 | 50.0 | |
| Por | reflecting surface | | | | | | |

Second Embodiment

In this embodiment, unlike with the above described first embodiment, the plurality of light beams emitted from the light emitting portions of the plurality of light source units 11a to 11d are guided to the deflection unit 5 by one reflection. Accordingly, the reflecting surface having a principal power of the light beam conversion elements 13c, 13d in the optical path A (SL) of the light beams emitted from the light source units 11c, 11d and the reflecting surface having a principal power of the light beam conversion elements 13a, 13b in the optical path B (SR) of the light beams emitted from the light source units 11a, 11b are located at different positions. In other words, in this embodiment, at least two light beam conversion elements (13a, 13b and 13c, 13d) among the plurality of light beam conversion elements 13a to 13d have optical arrangements different from each other.

Such optical arrangements generally suffer from a problem that the light beam conversion elements 13c, 13d in the optical path A and the light beam conversion elements 13a, 13b in the optical path B have different focal lengths with respect to the main scanning direction, which leads to different light beam utilization efficiency. However, in this embodiment, the focal lengths with respect to the main scanning direction of the light beam conversion elements in the optical paths A and B are made equal to each other by making the arrangement of power (refracting power) including that of refracting surfaces different between the optical path A and the optical path B. Specifically, in this embodiment, at least two light beam conversion elements (13a, 13b and 13c, 13d) among the plurality of light beam conversion elements 13a to 13d are designed to have focal lengths equal to each other with respect to the main scanning direction.

Here, the incidence optical system in the optical path A will be described with regard to the light beam emitted from the light source unit 11c by way of example. The following argument also applies similarly to the light beam emitted from the light source unit 11d. The light beam emitted from the light source unit 11c enters the light beam conversion element 13c through the incidence surface (R1) 35c, then deflected by the total reflection surface (R2) 36c toward the deflection unit, and guided to the deflecting surface of the deflection unit 5 through the emergence surface (R3) 37c. In this embodiment also, the reflecting surface 36c is an anamorphic surface, and the power is mainly allotted to the reflecting surface 36c, as with the above-described first embodiment.

Since the reflecting surface 36c is located more distant from the light source unit as compared to the reflecting surface 36a in the optical path B, the incidence surface 35c is designed to be anamorphic surface having a positive power, whereby the principal plane with respect to the main scanning direction of the light beam conversion element 13c in the optical path A is shifted in the direction from the reflecting surface 36c toward the light source unit 11c. The emergence surface 37c is a diffracting surface having an anamorphic power. The emergence surface 37c provides temperature compensation for the light beam conversion element 13c, as with the first embodiment. The incidence surface 35c may be a planar surface.

The incidence optical system in the optical path B will be described with regard to the light beam emitted from the light source unit 11a by way of example. The following argument also applies similarly to the light beam emitted from the light source unit 11b. The light beam emitted from the light source unit 11a enters the light beam conversion element 13a through the incidence surface (R1) 35a, then deflected by the total reflection surface (R2) 36a toward the deflection unit, and guided to the deflecting surface of the deflection unit through the emergence surface (R3) 37a. In this embodiment also, the reflecting surface 36a is an anamorphic surface, and the power is mainly allotted to the reflecting surface 36a, as with the above-described first embodiment.

Since the reflecting surface 36a is located closer to the light source unit as compared to the reflecting surface 36c in the optical path A, the emergence surface 37a is designed to be anamorphic surface having a positive power, whereby the principal plane with respect to the main scanning direction of the light beam conversion element 13a in the optical path B is shifted in the direction from the reflecting surface 36c toward the deflection unit. The emergence surface 37a is also a diffracting surface having an anamorphic power. The emergence surface 37a provides temperature compensation for the light beam conversion element 13a, as with the first embodiment. The incidence surface 35a is a planar surface.

By making the powers of the light beam conversion elements 13a and 13c in the optical path A and the optical path B different from each other to control the principal planes, the positions of the principal planes in the respective optical paths are aligned, and the focal lengths are made equal to each other. In this way, the utilization efficiencies of the light beams emitted from the light source units 11a and 1c are made equal to each other.

Figure 8:
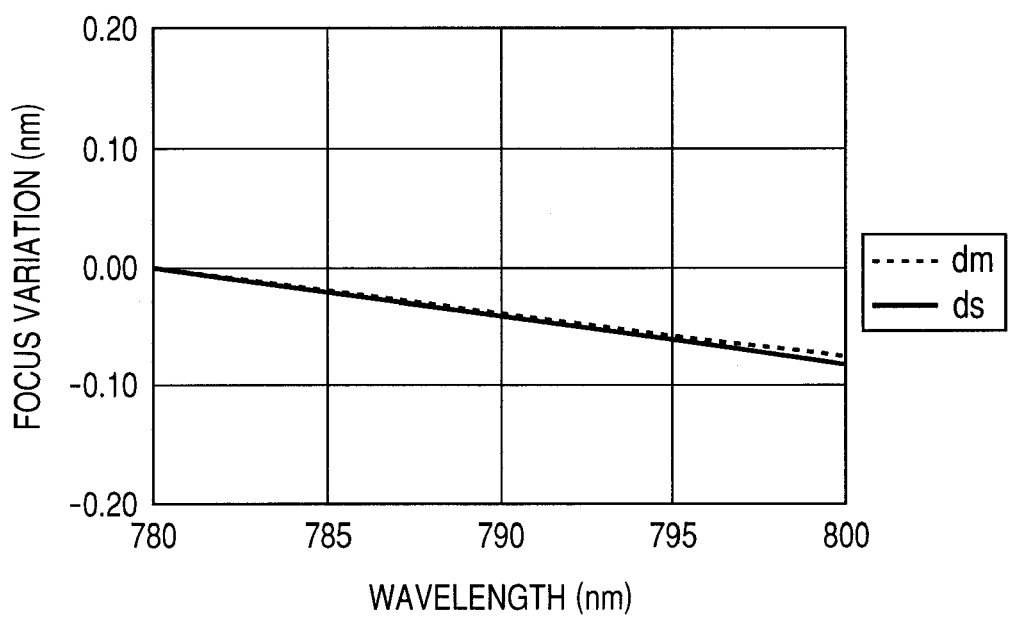
FIG. 8 shows wavelength characteristics in a first optical path A of an anamorphic collimator lens used in the scanning optical apparatus according to the second embodiment of the present invention.
Figure 10:
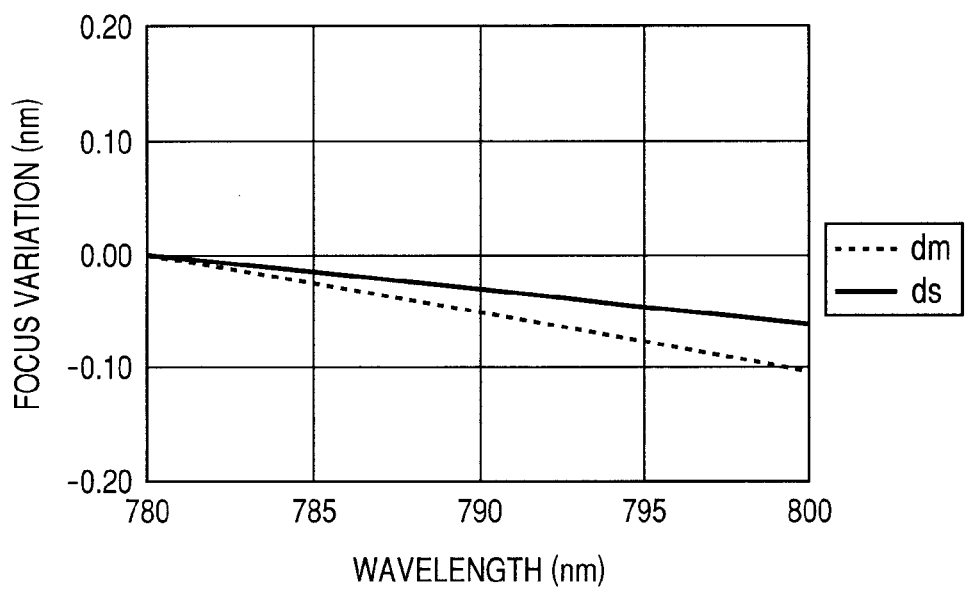
FIG. 10 shows wavelength characteristics in a second optical path B of the anamorphic collimator lens used in the scanning optical apparatus according to the second embodiment of the present invention.

FIG. 8 shows wavelength characteristics of the light beam conversion elements 13c, 13d in the optical path A in this embodiment. FIG. 10 shows wavelength characteristics of the light beam conversion elements 13a, 13b in the optical path B in this embodiment. FIGS. 8 and 10 show focus variations with respect to the main scanning direction (dm) and the sub scanning direction (ds) with changes in the wavelength.

Typically, there is a wavelength difference of about 2 nm between the light beams emitted from a plurality of light emitting portions (light emitting points) of a semiconductor laser by its tolerance. As shown in FIGS. 8 and 10, in this embodiment, a variation in the optical characteristic associated with a wavelength difference of 2 nm is 7 μm in the main scanning direction and 8 μm in the sub scanning direction in the case of the optical path A, and 10 μm in the main scanning direction and 6 μm in the sub scanning direction in the case of the optical path B. These variations are satisfactorily small. The absolute wavelength of the semiconductor laser varies by an amount larger the aforementioned wavelength difference. However, this does not matter, because this can be corrected by "laser adjustment" (i.e. adjustment of the distance between the light source unit and the anamorphic collimator lens) as long as the wavelengths of the light beams emitted from the plurality of light emitting portions are uniform.

Figure 9:
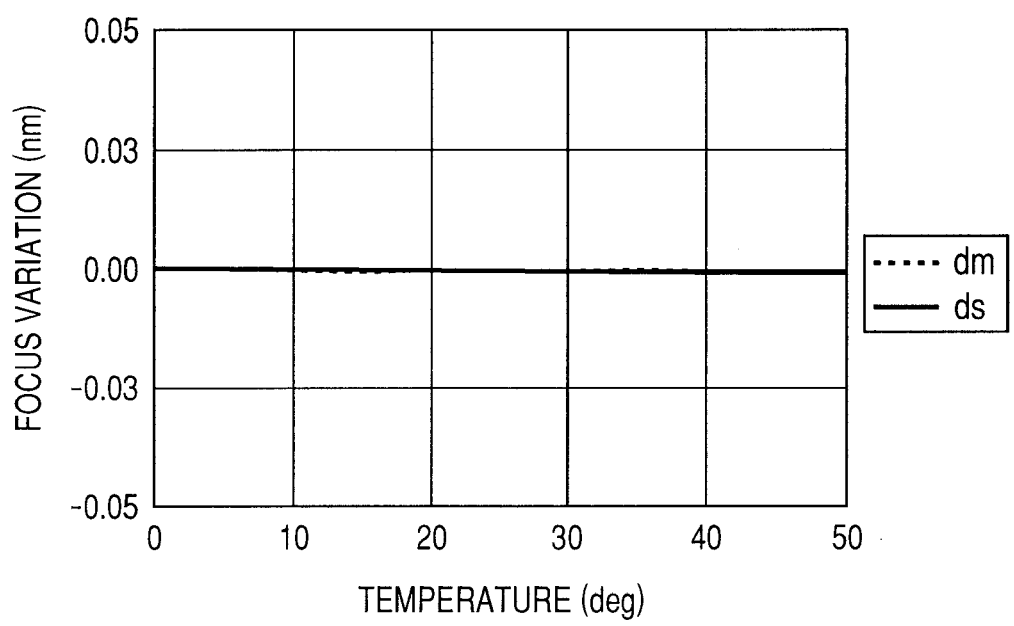
FIG. 9 shows temperature characteristics in the first optical path A of the anamorphic collimator lens used in the scanning optical apparatus according to the second embodiment of the present invention.
Figure 11:
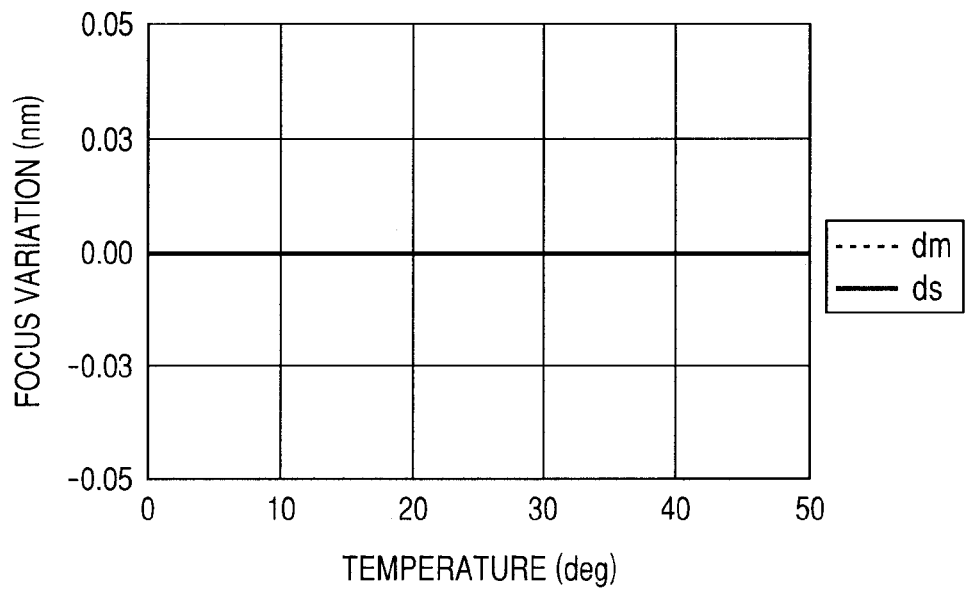
FIG. 11 shows temperature characteristics in a second optical path B of the anamorphic collimator lens used in the scanning optical apparatus according to the second embodiment of the present invention.

FIG. 9 shows temperature characteristics of the light beam conversion elements 13c, 13d in the optical path A according to this embodiment, and FIG. 11 shows temperature characteristics of the light beam conversion elements 13a, 13b in the optical path B according to this embodiment. FIGS. 9 and 11 show focus variations with respect to the main scanning direction (dm) and the sub scanning direction (ds) with changes in the wavelength and changes in the refractive index that occur at the same time due to changes in temperature.

Temperature changes that are expected to occur in the body of the image forming apparatus are about ±25 degrees typically. As shown in FIGS. 9 and 10, changes in the optical characteristic associated with such temperature changes are not larger than 1 μm in both the main scanning direction and the sub scanning direction in the optical path A and in the optical path B, which are satisfactorily small. The focus variations discussed herein with reference to FIGS. 8 to 11 are those on the light source unit side. Focus variations on the scanned surface side corresponding to those on the light source unit side can be obtained by multiplying them by the axial magnification of the entire optical system, which is typically about 25 to 100.

In this embodiment, the distance from the reflecting surface 36a, 36b to the emergence surface 37a, 37b in the optical path B is larger than the distance from the reflecting surface 35c, 35d to the emergence surface 36c, 36d in the optical path A by 4 mm. Consequently, the distance L1 between the light source units (i.e. the distance between the light source unit 11a or 11b and the light source unit 11c or 11d) with respect to the main scanning direction can be made larger than the distance L2 on the emergence surface between light beams corresponding to the two light source units by 4 mm. Thus, the increased space can be made use of as a space for allowing chucking of the semiconductor lasers for adjustment and as a space for allowing fixation of the semiconductor lasers after the adjustment.

(Color Image Forming Apparatus)

Figure 12:
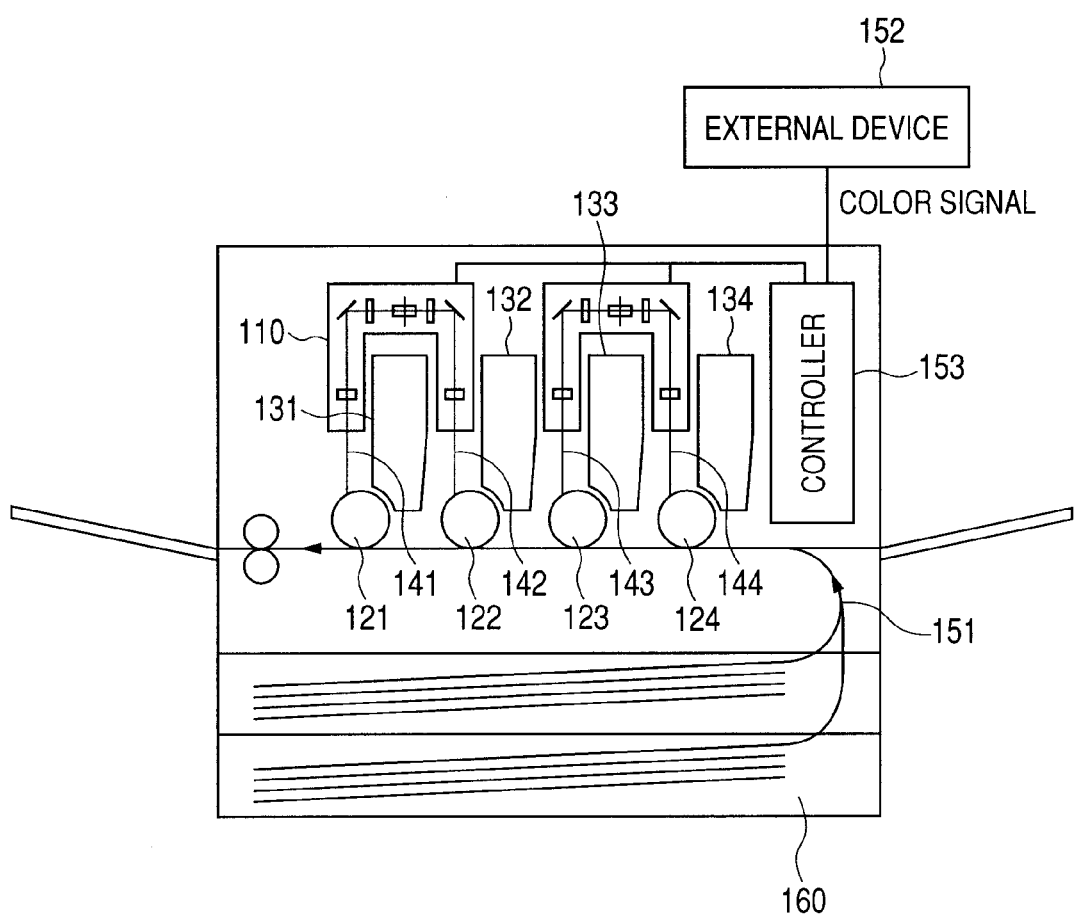
FIG. 12 is a cross sectional view of a color image forming apparatus according to an embodiment of the present invention taken on the main scanning section.

FIG. 12 schematically shows the relevant portions of a color image forming apparatus according to an embodiment of the present invention. The color image forming apparatus 160 shown in FIG. 12 includes scanning optical apparatuses 110 each having the structure of the above described embodiment 1 or 2, photosensitive drums 121, 122, 123, 124 serving as image bearing members, developing devices 131, 132, 133, 134, and a conveying belt 151.

To the color image forming apparatus 160 shown in FIG. 12, color signals of R (red), G (green), and B (blue) are input from an external device 152 such as a personal computer. These color signals are converted into image data (dot data) of C (cyan), M (magenta), Y (yellow), and B (black) by a printer controller 153 provided in the apparatus. The image data of each color is input to the corresponding scanning optical apparatus 110. The scanning optical apparatuses emit light beams 141, 142, 143, 144 that are modulated in accordance with the corresponding image data. These light beams 141, 142, 143, 144 scan the photosensitive surfaces of the photosensitive drums 121, 122, 123, 124 along the main scanning direction.

The color image forming apparatus according to this embodiment forms latent images of the respective colors on the corresponding photosensitive drums 121, 122, 123, 124 using the plurality of light beams reflecting the respective image data emitted from the scanning optical apparatuses 110 as described above. The latent images are developed, and thereafter, the developed images are transferred onto a recording material by multi-layer transfer to form one color image.

The aforementioned external device 152 may be a color image reading apparatus having a CCD sensor. If this is the case, the color image reading apparatus and the color image forming apparatus 160 constitute a color digital copying machine.

There is no particular limitation to the resolution of the image forming apparatus to which the present invention is applied. However, in view of the fact that the higher the resolution is, the higher the image quality is required to be, the configurations according to the first and the second embodiments of the present invention will be more effectively applied to image forming apparatuses having a resolution of 1200 dpi or higher.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-179027, filed Jul. 31, 2009, which is hereby incorporated by reference herein in its entirety.

What is claimed is:

1. An optical scanning apparatus comprising:
   first and second light source units;
   a light beam conversion unit that converts the beam condensing condition of first and second light beams emitted from the first and second light source units;
   a deflection unit that deflectively scans the first and second light beams emitted from the light beam conversion unit; and
   first and second imaging optical systems that focus the first and second light beams deflectively scanned by first and second deflecting surfaces of the deflection unit onto first and second surfaces to be scanned, respectively,
   wherein the first and second light source units are arranged side by side along a main scanning direction,
   wherein the light beam conversion unit includes first and second light beam conversion elements that reflect the first and second light beams emitted in the same direction from the respective first and second light source units to deflect the first and second light beams in the same direction, and
   wherein the first and second light beam conversion elements are arranged in such a way that a distance along the main scanning direction between the first and second light source units is larger than a distance between the light beams corresponding to the first and second light source units on an emergence surface of the light beam conversion unit.

2. A scanning optical apparatus according to claim 1, wherein the light beam conversion unit converts the first and second light beams emitted from the first and second light source units into collimated light beams with respect to the main scanning direction and convergent light beams that are focused on the deflecting surface of the deflection unit with respect to a sub scanning direction.

3. A scanning optical apparatus according to claim 1, wherein each of the first and second light source units has a plurality of light emitting portions.

4. A scanning optical apparatus according to claim 1, wherein the first and second light source units are mounted on the same electrical substrate.

5. A scanning optical apparatus according to claim 1, wherein each of the reflecting surfaces of the first and second light beam conversion elements has different powers with respect to the main scanning direction and with respect to a sub scanning direction.

6. A scanning optical apparatus according to claim 1, wherein the first and second light beam conversion elements have the same focal length with respect to the main scanning direction.

7. A scanning optical apparatus according to claim 1, wherein each of the reflecting surfaces of the first and second light beam conversion elements is a total reflection surface.

8. A scanning optical apparatus according to claim 1, wherein each of the first and second light conversion elements is made of a plastic and has at least one reflecting surface having a power and at least one diffracting surface having a power.

9. An image forming apparatus comprising first and second image bearing members that are respectively disposed at the first and second surfaces to be scanned of the scanning optical apparatus according to claim 1 and on which images of different colors are formed.

10. A scanning optical apparatus according to claim 1, wherein each of the first and second light beam conversion elements has different powers with respect to the main scanning direction and with respect to a sub scanning direction.

11. A scanning optical apparatus according to claim 1,
wherein each of the first and second light conversion elements has first and second reflecting surfaces,
wherein the first and second light beams emitted from the first and second light source units are deflected by the first reflecting surfaces of the corresponding light conversion elements in a direction toward each other, and
wherein the first and second light beams deflected by the first reflecting surfaces are further deflected by the second reflecting surfaces of the corresponding light conversion elements in such a way that the first and second light beams are incident on the first and second deflecting surfaces of the deflection unit, respectively.

12. A scanning optical apparatus according to claim 1,
wherein each of the first and second light conversion elements has a reflecting surface, and
wherein the reflecting surfaces of the first and second light conversion elements deflect in such a way that the first and second light beams are incident on the first and second deflecting surfaces of the deflection unit, respectively.

* * * * *